United States Patent
Bauer et al.

[11] Patent Number: 5,875,760
[45] Date of Patent: Mar. 2, 1999

[54] METHOD AND ARRANGEMENT FOR CONTROLLING A DRIVE UNIT OF A MOTOR VEHICLE

[75] Inventors: Torsten Bauer, Stuttgart; Martin Streib, Vaihingen, both of Germany

[73] Assignee: Robert Bosch GmbH, Stuttgart, Germany

[21] Appl. No.: 74,458

[22] Filed: May 8, 1998

[30] Foreign Application Priority Data

May 9, 1997 [DE] Germany .................. 197 19 518.0

[51] Int. Cl.$^6$ .................. F02D 9/10; F02D 41/22; F02D 11/10
[52] U.S. Cl. .................. 123/397; 123/399
[58] Field of Search .................. 123/396, 397, 123/399

[56] References Cited

U.S. PATENT DOCUMENTS

| | | | |
|---|---|---|---|
| 5,170,769 | 12/1992 | Berger et al. | 123/399 |
| 5,224,453 | 7/1993 | Bederna et al. | 123/479 |
| 5,327,865 | 7/1994 | Riehemann | 123/397 |
| 5,447,134 | 9/1995 | Yokoyama | 123/399 |
| 5,501,193 | 3/1996 | Schneider et al. | 123/399 |

*Primary Examiner*—Erick R. Solis
*Attorney, Agent, or Firm*—Walter Ottesen

[57] ABSTRACT

The invention is directed to a method of controlling a drive unit of a motor vehicle wherein the drive unit is controlled in dependence upon at least one operating variable. The operating variable is detected with at least first and second measuring devices as first and second quantities, respectively, thereby providing a redundant detection of the operating variable. The two measuring devices are mounted so that they move in synchronism with each other within a predetermined tolerance. The second quantity is checked for a fault utilizing a comparison in the context of the tolerance of the synchronism of movement. A fault without a movement out of the tolerance is detected when the value of the second quantity does not change in correspondence to the value of the first quantity within at least a predetermined value range of the operating variable. The invention is also directed to an arrangement of controlling the drive unit in dependence upon the operating variable.

11 Claims, 2 Drawing Sheets

METHOD AND ARRANGEMENT FOR CONTROLLING A DRIVE UNIT OF A MOTOR VEHICLE

BACKGROUND OF THE INVENTION

U.S. Pat. No. 5,224,453 discloses a method and an arrangement for controlling a drive unit of a motor vehicle. Here, at least one operating variable of the drive unit or of the motor vehicle is detected utilizing two mutually redundant measuring devices. The drive unit is controlled in dependence upon at least one of the two detected measured variables. The detected operating variable is especially the position of an operator-controlled element for controlling the power of the drive unit. The operator-controlled element is actuable by the driver. The power of the drive unit is controlled by adjusting at least one power parameter in dependence upon one of the measured signal quantities which represents the extent of the actuation of the operator-controlled element by the driver and therefore the driver's request for power. To ensure operational safety and operability of the control of the drive unit, the first measured signal quantity is compared to the second measured signal quantity, which is detected by the redundant measuring device. If the two measured signal quantities deviate impermissibly from each other, then a fault state is detected in the area of measurement value detection and, if necessary, an emergency operation of the control is initiated. In the preferred embodiment, this synchronous monitoring is carried out only in selected value ranges of the operating variable, such as above the idle range.

When comparing the two signal values to each other, a maximum synchronous tolerance must be considered between the two measuring devices. This means that the monitoring only then responds in the sense of the fault detection when the two signal values differ from each other by more than the maximum synchronous tolerance. In the value ranges in which the monitoring is not carried out or with lower sensitivity, the synchronous tolerance applied outside of this value range does not apply.

The signal of one of the measuring devices is used as a so-called lead variable for controlling the drive unit. When there is a transition from the range without synchronous monitoring into the range with synchronous monitoring, the fault monitoring only responds when the lead variable has moved away from the range boundary by the amount of the synchronous tolerance.

If the measuring devices are connected to the accelerator pedal, then a signal, which corresponds to the driver command, is derived from the lead measuring device. For this purpose, a scale point is determined from which a fuel command of the driver can be assumed. This scale point, at which the pedal angle is assumed to be 0, is fixed when leaving the idle point while considering the synchronism tolerance. Accordingly, a fault condition can only then be detected from a comparison of the two signal values when the lead measuring device has already moved by the synchronism tolerance in the region wherein a gas command of the driver is assumed. This means that, in the case of an actual fault, the drive unit is first controlled in the sense of a power increase until the signal of the lead variable has exceeded the scaling point by the synchronism tolerance.

A corresponding situation also occurs when the synchronism monitoring is active. Here too, it can occur that a measurement signal moves defectively within the synchronism tolerance because of drift without a fault being detected. A fault detection here too also only takes place when the tolerance is exceeded.

SUMMARY OF THE INVENTION

It is an object of the invention to improve monitoring of the detection of an operating variable such as the measurement value which represents the accelerator pedal actuation by the driver.

The method of the invention is for controlling a drive unit of a motor vehicle wherein the drive unit is controlled in dependence upon at least one operating variable. The method includes the steps of: detecting the operating variable with at least first and second measuring devices as first and second quantities, respectively, whereby the operating variable is detected redundantly; mounting the first and second measuring devices so that the first and second measuring devices move in synchronism with each other within a predetermined tolerance; checking values of the second quantity for a fault utilizing a comparison in the context of the tolerance of the synchronism; and, detecting a fault without a movement out of the tolerance when the value of the second quantity does not change in correspondence to the value of the first quantity within at least a predetermined value range of the operating variable.

With the procedure provided by the invention, the monitoring of the lead variable of a control of a drive unit is improved in an advantageous manner. It is especially advantageous that a fault condition, such as drifting of the lead measuring device, is already detected before the monitoring of the synchronism (synchronous monitoring) can detect this situation. The monitoring of the redundant operating variable values is improved. It is especially advantageous when the solution of the invention is applied only in selected regions, for example, in the idle range or in the lower fuel range wherein such fault conditions have special effects on the control of the engine.

For a transition from a range without synchronous monitoring into a range with synchronous monitoring, it is especially advantageous that a control of the drive unit on the basis of the lead variable can be prevented in the case of a fault. For the application of the solution of the invention to the determination of a fuel command of the driver from the position of the accelerator pedal, it is especially advantageous that the defective detection of a fuel command is no longer possible, for example, because of a corroded contact.

Special advantages result with the application of the procedure of the invention in combination with potentiometers for controlling the power of a drive unit of a motor vehicle.

BRIEF DESCRIPTION OF THE DRAWINGS

The invention will now be described with respect to the drawings wherein.

DESCRIPTION OF THE PREFERRED EMBODIMENTS OF THE INVENTION

Figure 1:
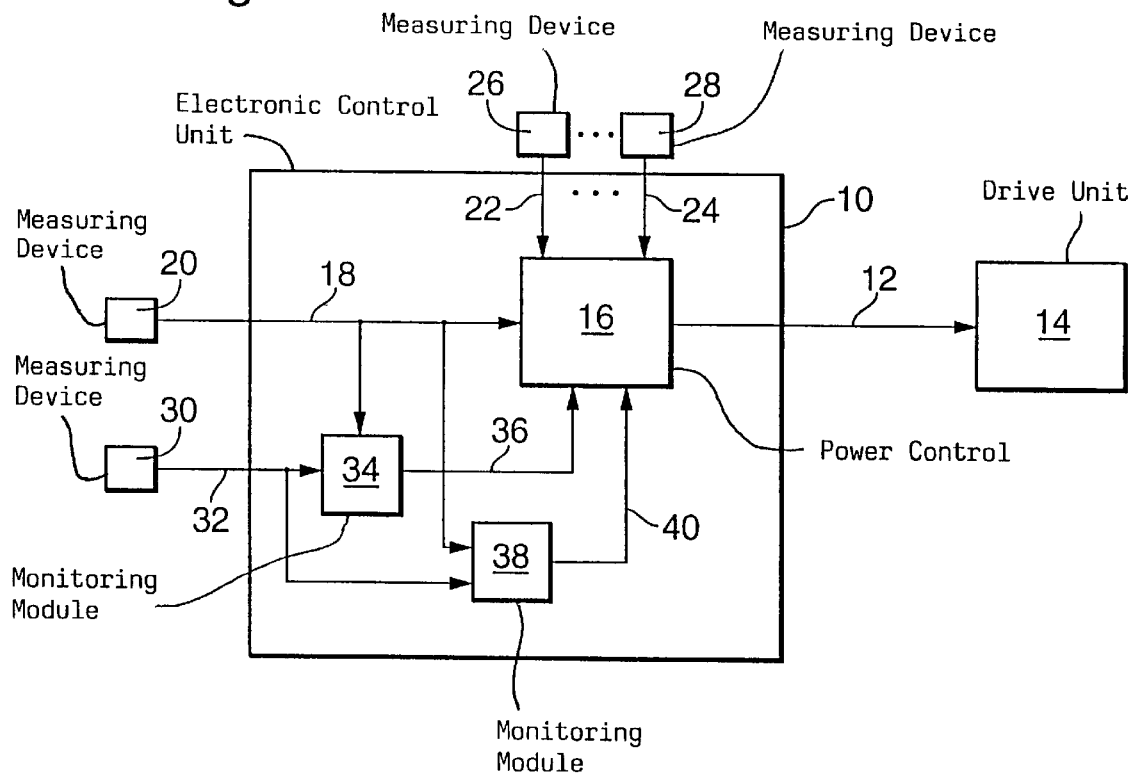
FIG. 1 is an overview block circuit diagram of a power control of a drive unit of a motor vehicle wherein monitoring measures for the lead variable of the power control are presented.

FIG. 1 shows an overview block diagram of a power control for a drive unit. Electronic control unit 10 includes at least one microcomputer in the preferred embodiment. This electronic control unit 10 controls the power of the drive unit 14 via at least one output line 12.

In the preferred embodiment, the drive unit 14 constitutes an internal combustion engine whose power is controlled by adjusting an electrically actuable throttle flap. The control unit 10 (the microcomputer) includes a power control 16 which is known per se with respect to its basic attributes and is therefore not explained further in the following. This power control 16 is supplied with a signal from a measuring device 20 via an input line 18. This signal represents the actuation of an operator-controlled element actuable by the driver.

In the preferred embodiment, the measuring device 20 is a potentiometer which detects the position of an accelerator pedal actuable by the driver. Furthermore, the power control 16 is supplied with further operating variables of the drive unit and/or of the motor vehicle from measuring devices 26 to 28 via input lines 22 to 24, respectively. These operating variables are evaluated for controlling the power. Operating variables of this kind are, for example, the intervention of a drive slip control, the engine rpm, the engine load, the engine temperature, et cetera. Furthermore, an additional measuring device 30 is provided which is configured redundant to the measuring device 20 and measures the same measurement quantity. The signal value of the measuring device 30 is supplied via a line 32 to the electronic control unit 10.

The control unit 10 or the microcomputer includes a first monitoring module 34 to which the signal quantities of the measuring devices 20 and 30 are supplied. In this monitoring module 34, the monitoring with respect to synchronism (which is known from the state of the art) of the two signal quantities is carried out. In the event of a fault, the power control 16 is influenced in the sense of an emergency operation via a line 36. In addition, the control unit 10 (the microcomputer) includes a further monitoring module 38 to which the signal quantities of the measuring devices 20 and 30 are likewise supplied. Here, the movement monitoring (that is, the monitoring within the synchronous tolerance or synchronous tolerance range) takes place. This monitoring module also influences the power control 16 via a line 40 when a fault is detected.

During normal operation, the power control 16 detects the voltage value UPWG1 transmitted from the measuring device 20. In the preferred embodiment, this voltage value can vary between 0 and 5 volts. Starting from the detected voltage value, the power control 16 determines the pedal angle from this signal which is ultimately converted into a driver command, that is, the command for fuel.

A so-called scale value is fixed to determine the pedal angle from the voltage value. At this scale value, the pedal angle is assumed to be 0, that is, the accelerator pedal is released. Above this scale value, the pedal angle is determined in linear dependency in correspondence to the voltage magnitude. In a preferred embodiment, the scale point lies at 21% referred to the total voltage excursion of 0 to 5 volts. This is shown in FIG. 2.

Figure 2:
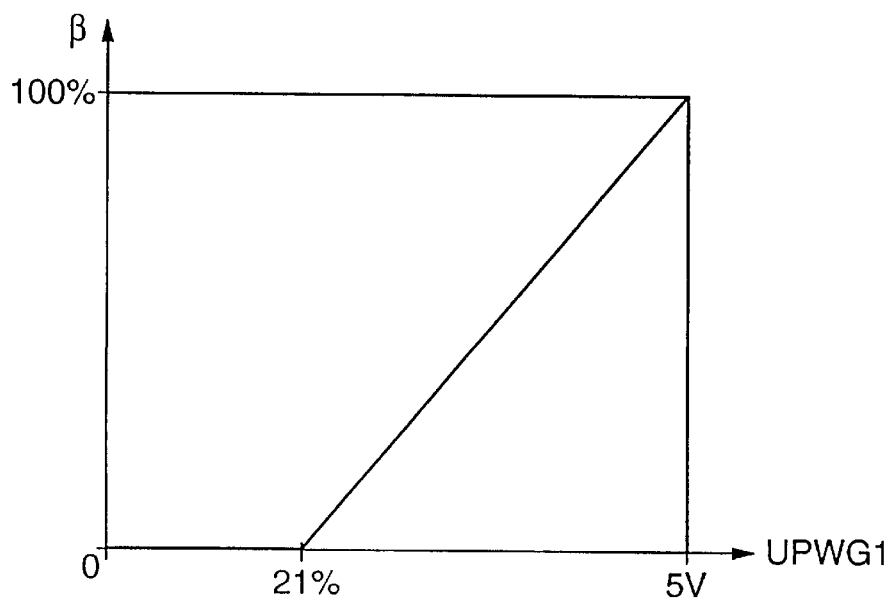
FIG. 2 is a diagram wherein the procedure for determining a fuel command of the driver is shown; and, FIG. 3 shows the monitoring of the lead variable with respect to a block circuit diagram. Fault conditions in the context of synchronous tolerance can be detected with the aid of this block circuit diagram.

Referring to FIG. 2, the pedal angle β is plotted as a function of the voltage value UPWG1 and the scale point is at 21% as shown. The driver command for controlling the power of the drive unit is derived from the pedal angle. Starting from this driver command, a drive signal to adjust the power is determined via at least one controllable power parameter (in the preferred embodiment, via the position of a throttle flap). Thereafter, the drive signal is outputted. In this way, the operating variables supplied via lines 22 to 24 can be taken into consideration.

The power control can lead to an unwanted supplying of fuel when there is a defect in the lead signal UPWG1 of the measuring device 20. The monitoring module 34 is provided to monitor the power control. In the module 34, the signal value of the measuring device 20 is compared to the signal value of the measuring device 30 which is redundant to measuring device 20. The measuring devices 20 and 30 are mounted so that they move in synchronism with each other. If the two signal values deviate by more than the maximum synchronous tolerance, then the monitoring module 34 outputs a fault signal and initiates an emergency operation of the power control. This emergency operation can be provided in the form of a limitation of the power, for example, by a cutoff of the fuel metering above an engine rpm threshold.

As mentioned initially herein, monitoring in the idle range (at voltages below the scale point) is dispensed with for synchronous monitoring in the monitoring module 34. In this case, it can occur that the signal quantity of the lead measuring device 20 has already moved beyond the scale point by the synchronous tolerance without the monitoring module 34 having detected a fault condition even when there is a fault present. As a consequence thereof, a power command of the driver is detected and carried out even in the case of a fault. A fault condition results, however, only when the lead signal UPWG1 has changed beyond the synchronous tolerance. A drift within the synchronous tolerance can, for example, occur when contacts are corroded in the region of the lead measuring device 20 or because of dirt in the region of the measuring device 20.

For this reason, an improvement or refinement of the synchronous monitoring is provided in the monitoring module 38. The monitoring strategy in the monitoring module 38 utilizes the condition that, at the scale point (21%), the lead signal quantity already has moved out of the idle region. Since both measuring devices are mounted on a shaft, this must also apply to the monitoring signal UPWG2 of the second measuring device 30. Starting from this fact, the movement of the lead signal variable is detected and a possible fault condition is determined. If the lead signal variable leaves the idle region, the previous value of the signal quantity of the measuring device 30 is stored via a flank detection. A delay by a scanning interval is necessary in order to detect the original value of the second measuring device 30 also for a rapid movement of the lead signal quantity.

If the lead signal quantity reaches the scale start, then the signal value of the second measuring device 30 must also have moved in the normal state. The stored signal value before the movement must therefore have changed by a value Δ. If this is not the case, then it is assumed that a fault condition is present and the power control 16 is so influenced that the signal quantity of the measuring device 20 is not converted to a power command of the driver.

In the preferred embodiment, this takes place via a shift of the scale start to a larger value at which the synchronous monitoring of the monitoring module 34 again becomes active. Another advantageous solution is that, when a fault condition is detected, the power command, which is formed from the signal quantity of the measuring device 20, is ignored and does not lead to a power change of the drive unit.

Figure 3:
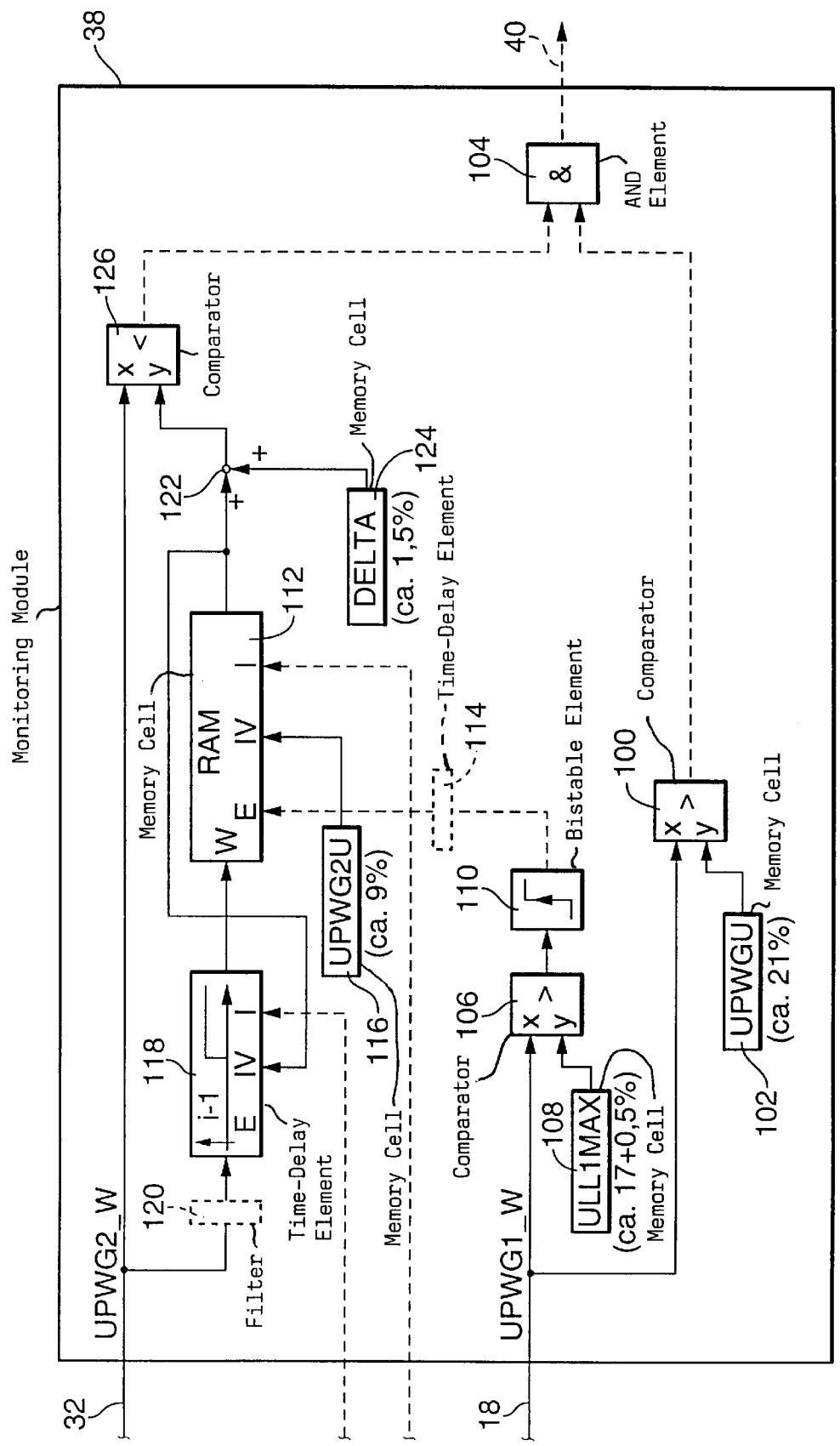

The movement detection, which is carried out in monitoring module 38, is shown in detail with respect to the block circuit diagram of FIG. 3 in a preferred embodiment. There, the monitoring module 38 is shown with the input line 32 via which the signal value UPWG2 of the second measuring device is supplied and input line 18 via which the signal value UPWG1 of the first measuring device is supplied. In addition, the output line 40 is shown and serves for influencing the power control 16. The signal value UPWG1 is compared in a comparator 100 to the signal value UPWGU stored in a memory cell 102. This signal value UPWGU identifies the scale start for the conversion of the signal UPWG1 into the pedal angle β. In the preferred embodiment, the scale start lies at 21%. If the signal value UPWG1 exceeds the stored value UPWGU, a corresponding signal is outputted from comparator 100 to a logic AND element 104.

In addition, the signal value UPWG1 is compared to a value ULL1max stored in a memory cell 108. This comparison is made in a further comparator 106. The value ULL1max lies below the scale value (memory cell 102) and identifies the upper limit of the idle range of the accelerator pedal position, that is, the released accelerator pedal. In one embodiment, this value lies at 17%.

If the signal value UPWG1 exceeds the stored value ULL1max, a positive flank is generated in a bistable element 110. This positive flank is applied to a further memory cell 112 where it triggers a storage operation.

In a preferred embodiment, the positive flank generated in element 110 is delayed by a specific time in a time-delay element 114 so that the positive flank is only then outputted to the memory cell 112 when the signal value UPWG1 has been found in the idle gas range for a specific time. This prevents a storage in the memory cell 112 when there is a disturbance signal. The positive flank is supplied to the enable input E of the memory cell 112. By applying a positive flank to this input of the memory cell 112, the signal, which is present at input W is assumed and stored.

An initialization of the memory cell 112 with a value UPWG2U (for example, 9%), which is stored in the memory cell 116, for the signal value of the second measuring device is stored in the context of the initialization after the battery is disconnected and is thereby undertaken when there is an interruption of the voltage supply for the electronic control unit (input I). The value UPWG2U identifies the minimum voltage value that the measuring device 30 can have in the idle range.

The signal value UPWG2 of the second measuring device is applied to the input W of the memory cell 112. This signal value is supplied via a time-delay element 118 to the memory cell 112. The time-delay element 118 delays the signal value by precisely one scanning interval. The initialization of the electronic control unit is detected with the switch-on of the ignition via the input I of the time-delay element 118. When this initialization takes place, the value, which is stored in the memory cell 112, is entered as start value into the time-delay element 112 at input IV. With each scanning time point, the time-delay element 118 outputs the signal UPWG2 to the memory cell 112, which was at the input of time-delay element 118 at each previous scanning time point.

In a preferred embodiment, a filter 120 is provided forward of the time-delay element 118 and smoothes the applied signal UPWG2 and filters out disturbances. In the preferred embodiment, the filter is one sided, that is, only changes of the signal value UPWG2 in the downward direction (to lower voltage values) are filtered. The signal value, which is stored in the memory cell 112, is supplied to a logic coupling element 122. In this logic coupling element 122, the stored signal value is added to the value Δ stored in the memory cell 124. The sum of the two values is supplied to a comparator 126 to which the signal UPWG2 is also supplied. If the signal UPWG2 drops below the signal value present at the other input of the comparator 126, then the signal of the measuring device 30 has not moved sufficiently. This leads to a corresponding signal to the AND element 104. If positive signal values are present at the two inputs of the AND element 104 (that is, the signal value UPWG2 has not moved sufficiently and the signal value UPWG1 has exceeded the scale value), then the scale value UPWGU is shifted via the line 40 so that no pedal angle is determined based on the signal value UPWG1.

If a movement of the lead signal quantity UPWG1 out of the idle range is detected via the comparator 106, then that value UPWG2 of the second measuring device, which was present at the previous scanning time point, is stored in the memory cell 112. If the lead signal quantity exceeds the scale value, which is stored in the memory cell 102, and if the signal value UPWG2 drops below a limit value (which is formed from the stored value and a Δ value), then a detection is made in the AND element 104 that the lead signal quantity has moved beyond the scale point but that the signal quantity (UPWG2) of the monitoring measuring unit has not, however, moved to a corresponding degree. In this case, one can assume a fault condition within the synchronous tolerance of the two measuring devices and appropriate measures in the region of power control are initiated via the line 40. In the preferred embodiment, the scale limit is shifted to higher values so that no fuel is metered because of the drift of the lead signal UPWG1; instead, fuel is metered via the accelerator pedal only when the synchronous monitoring is active again.

The solution provided by the invention was described above with respect to an embodiment for detecting the position of an accelerator pedal. The solution of the invention can be utilized with the advantages presented above also in combination with the redundant detection of other operating variables of a drive unit or of a motor vehicle wherein a synchronous monitoring is carried out for monitoring purposes and this monitoring is carried out in at least one value range not at all or only in a limited manner. For example, for the detection of such measured quantities, the detection of the position of a throttle flap or of an idle actuator or the detection of engine load is possible, for example, via a hot-film sensor and a throttle flap position sensor.

The solution provided by the invention was described with respect to a preferred embodiment wherein the synchronous monitoring is limited in the idle range. However, the solution of the invention with its advantages can also be applied to active synchronous tolerance. The value of the second measuring device is stored as soon as a movement of the value of the first measuring device is detected, preferably only in the idle range when the above-mentioned thresholds are exceeded or generally for a change of the actual value. In this case, the above-mentioned check of the corresponding movement of the value of the second measuring device is carried out and emergency measures are carried out in the case of a fault.

It is understood that the foregoing description is that of the preferred embodiments of the invention and that various changes and modifications may be made thereto without departing from the spirit and scope of the invention as defined in the appended claims.

What is claimed is:

1. A method of controlling a drive unit of a motor vehicle wherein the drive unit is controlled in dependence upon at least one operating variable, the method comprising the steps of:

detecting said operating variable with at least first and second measuring devices as first and second quantities, respectively, whereby said operating variable is detected redundantly;

mounting said first and second measuring devices so that said first and second measuring devices move in synchronism with each other within a predetermined tolerance;

checking values of said second quantity for a fault utilizing a comparison in the context of said tolerance of said synchronism; and, detecting a fault without a movement out of said tolerance when the value of said second quantity does not change in correspondence to the value of said first quantity within at least a predetermined value range of said operating variable.

2. The method of claim 1, wherein said operating variable is the position of an operator-controlled element actuated by the driver of said vehicle; and, wherein the power of said drive unit is controlled in dependence upon said operator-controlled element.

3. The method of claim 2, wherein said value range corresponds to the idle range of said drive unit.

4. The method of claim 1, comprising the further steps of:

providing an upper idle limit for said first quantity of said first measuring device; and, detecting when said first quantity exceeds said limit value from the value of said operating variable.

5. The method of claim 4, comprising the further step of:

storing said second quantity when said first quantity moves out of said idle range.

6. The method of claim 5, storing the value of said operating variable present at the last scanning time point to provide a stored value.

7. The method of claim 6, wherein said second quantity is compared to a value formed from a delta value and said stored value.

8. The method of claim 2, comprising the further step of providing a scale limit starting from which a power command of the driver is determined from said operating variable.

9. The method of claim 7, comprising the further step of detecting a fault when said first quantity exceeds said predetermined value range and said second quantity has not exceeded the sum of the stored value and said delta value.

10. The method of claim 8, wherein said operating variable is not applied to control said drive unit when a fault is detected and especially when a scale limit is shifted.

11. An arrangement for controlling a drive unit of a motor vehicle, the drive unit being controlled in dependence upon an operating variable, the arrangement comprising:

a first measuring device for detecting said operating variable as a first quantity;

a second measuring device for redundantly detecting said operating variable as a second quantity;

said first and second measuring devices being mounted so as to move in synchronism with each other and said synchronism having a predetermined tolerance range;

an electronic control unit connected to said first and second measuring devices for receiving said first and second quantities, respectively;

said electronic control unit including means for checking values of said second quantity for a fault with a comparison in the context of said tolerance range of said synchronism; and, said electronic control unit further including means for detecting a fault without a movement out of said tolerance range when the value of said second quantity does not change in correspondence to the value of said first quantity within at least a predetermined value range of said operating variable.

* * * * *